(12) United States Patent
Pott et al.

(10) Patent No.: US 12,306,056 B2
(45) Date of Patent: May 20, 2025

(54) CONNECTING PIECE FOR FLUID-CONDUCTING LINE SYSTEMS

(71) Applicant: VOSS FLUID GMBH, Wipperfürth (DE)

(72) Inventors: Harald Pott, Hückeswagen (DE); Martin Baier, Much (DE)

(73) Assignee: VOSS Fluid GmbH, Wipperfürth (DE)

( * ) Notice: Subject to any disclaimer, the term of this patent is extended or adjusted under 35 U.S.C. 154(b) by 298 days.

(21) Appl. No.: 17/924,914

(22) PCT Filed: May 3, 2021

(86) PCT No.: PCT/EP2021/061514
§ 371 (c)(1),
(2) Date: Nov. 11, 2022

(87) PCT Pub. No.: WO2021/228596
PCT Pub. Date: Nov. 18, 2021

(65) Prior Publication Data
US 2023/0184611 A1   Jun. 15, 2023

(30) Foreign Application Priority Data

May 13, 2020   (DE) ..................... 10 2020 112 982.3

(51) Int. Cl.
*G01L 9/00* (2006.01)
*G01L 19/00* (2006.01)
*G01L 19/08* (2006.01)

(52) U.S. Cl.
CPC ........ *G01L 19/0023* (2013.01); *G01L 19/086* (2013.01)

(58) Field of Classification Search
CPC . G01L 19/0023; G01L 19/086; G01L 19/003; G01L 9/0027; G01L 19/04;
(Continued)

(56) References Cited

U.S. PATENT DOCUMENTS 2,420,148 A   5/1947   Ostergren
4,738,140 A   4/1988   Kempf
(Continued)

FOREIGN PATENT DOCUMENTS

CN   205025504 U * 2/2016
CZ       2019464 A3 * 1/2021
(Continued)

*Primary Examiner* — Robert R Raevis
(74) *Attorney, Agent, or Firm* — Honigman LLP; Eric J. Sosenko; Jonathan P. O'Brien

(57) ABSTRACT

A connection socket for fluid-conducting line systems, and including a fluid channel extending along a fluid channel axis. The fluid channel may be connected to guide channels on at least a first and second connection ends of the connection socket. A measurement section is located between the first and second connection ends and a sensor system is provided therein to measure the pressure of a medium flowing within the fluid channel. The sensor system includes a connection interface for connecting to a control unit and measuring pressure in the fluid channel. For pressure measurement, at least two strain measurement sensors are arranged around the fluid channel axis on an outer wall of the measurement section. A control unit may be connected to the sensor system for measuring the pressure of a fluid in the connection socket.

23 Claims, 5 Drawing Sheets

(58) Field of Classification Search
CPC ..... G01L 9/0026; G01L 9/003; G01L 27/002;
G01L 27/005; G01N 19/0053
USPC ..... 73/1.59–1.62, 700, 708, 729.1, 730, 756
See application file for complete search history.

(56) References Cited

U.S. PATENT DOCUMENTS

| | | | |
|---|---|---|---|
| 6,055,213 A * | 4/2000 | Rubbo | E21B 47/24 367/40 |
| 6,957,588 B1 | 10/2005 | Kicher et al. | |
| 7,434,473 B1 | 10/2008 | Allen | |
| 2010/0319462 A1* | 12/2010 | Muskopf | G01L 1/26 73/856 |
| 2012/0082539 A1 | 4/2012 | Kanomata et al. | |
| 2019/0154526 A1 | 5/2019 | Burrow et al. | |
| 2019/0360883 A1 | 11/2019 | Bertone et al. | |

FOREIGN PATENT DOCUMENTS

| | | | | |
|---|---|---|---|---|
| DE | 10 2010 040 865 A1 | 3/2012 | | |
| DE | 202014103338 U1 * | 12/2014 | ............ | B25B 13/06 |
| DE | 10 2016 110 299 A1 | 12/2016 | | |
| EP | 1411336 A1 | 4/2004 | | |
| ES | 2295421 T3 * | 4/2008 | ........... | G06F 3/0414 |
| WO | WO-9315306 A1 * | 8/1993 | ............. | E21B 23/00 |
| WO | 2019171376 A1 | 9/2019 | | |

* cited by examiner

CONNECTING PIECE FOR FLUID-CONDUCTING LINE SYSTEMS

BACKGROUND

1. Field of the Invention

The invention relates to a connection socket for fluid-conducting line systems.

2. Description of Related Technology

In a fluid-conducting line system, in particular a hydraulic system, maximum pressures can reach up to 3200 bar, in particular with maximum pressures exceeding 3200 bar. Conventional pressure sensors for hydraulic systems are screwed into a T-connector or into a hole in a hydraulic block which is provided specifically for this purpose. This requires a great deal of effort in construction and a large amount of space. The sensor itself typically uses a membrane made of sensitive material, which is in contact with a medium which is inside a fluid channel. The medium compatibility is therefore limited by the sensitive membrane such that either the entire line system is only suitable for certain media, or that the line system can only monitor pressure with the use of specific media. In particular, hydrogen is very aggressive as a medium. Therefore, hydrogen-conducting line systems for example exhibit a reduced lifespan of the known sensors.

An additional disadvantage lies in the flow effects through the branches of the T-connector. Turbulence is generated at the branch point, which leads to loss of flow, as well as cavitation. In cavitation, air precipitation can occur due to shearing motion in the medium. Depending on temperature, the precipitated air can combust, wherein according to the diesel effect the medium—in particular an oil—ages and deposits or combustion residue accumulate. Thus the result of cavitation and the diesel effect is that the line system must be maintained more often and the lifespan of the line system decreases.

SUMMARY

In one aspect, a connection socket is described herein. The connection socket includes a fluid channel which extends along a fluid channel axis, wherein the fluid channel can be connected to guide channels of the line system on at least a first connection end and a second connection end of the connection socket. A measurement section is designed between the first connection end and the second connection end, in which a sensor system is arranged to measure the pressure of a medium flowing within the fluid channel. The sensor system features a connection interface, by which it can be connected to a control unit for measuring the pressure within the fluid channel. Additionally, the invention comprises a control unit to be connected to the sensor system for measuring the pressure of a fluid in the connection socket.

The object of the invention is to specify a connection socket which solves the problems known from the prior art, in particular by optimizing the lifespan and maintenance intervals and preferably by optimizing the medium-related range of application, advantageously while reducing the loss of flow.

This object is achieved according to the invention by the features of the connection socket according to claim 1, that the sensor system for pressure measurement features at least two strain measurement sensors, which are arranged in an offset manner around the circumference of the fluid channel axis on an outer wall of the measurement section.

High pressures inside the line system cause a mild expansion in the elastic area of the involved components, in particular the connection socket. The material of the connection socket is correspondingly forced in all directions under pressure. This invisible expansion is picked up by the strain measurement sensors arranged on the connection socket and is reproduced, or rather, passed to a control unit via the connection interface, as a change of resistance or voltage. The invention is therefore based on the recognition that conclusions can be drawn regarding the pressure in the line system by measuring the resulting expansion or change in length at the connection socket and interpreting this factor. The changes in length of the connection socket thereby correlate directly with the pressure being exerted within the line system, and thus the strain gauges used as pressure sensors do not come into contact with a medium being conducted within the line system.

The connection socket according to the invention additionally makes possible a method of measurement which can be retrofitted into existing line systems easily and in a space-conserving manner and is suitable for nearly any medium, with the only prerequisite being that the connection socket itself—that is, its material—is suitable for this medium. This means that the sensor system can also be used for aggressive media, such as hydrogen, for which it is currently difficult or expensive to find acceptable sensors.

Preferably, the strain measurement sensors are distributed around the circumference at 90° or 180° around the fluid channel axis. In particular, the strain measurement sensors are arranged offset to one another along the fluid channel axis. External influences, such as expansion or tension exerted upon the line system by outside factors, can thereby be compensated by the placement and interconnection of the strain measurement sensors. It is expedient to differentiate between expansion caused from the outside and expansion caused from the inside, which allows conclusions to be drawn about the pressure in the line system.

It is particularly advantageous that the strain measurement sensors are designed as strain gauges with at least one strain measurement sensor each.

The strain gauges each expediently feature a strain measurement sensor on a carrier film. Preferably, the strain gauges each feature two strain measurement sensors on a carrier film, wherein the first strain measurement sensor measures a longitudinal expansion in the longitudinal direction and the second strain measurement sensor measures a transverse expansion in the transverse direction. It is expedient that the two strain measurement sensors are rotated by 90° to one another on the respective carrier film and are arranged along the fluid channel axis behind one another in the longitudinal direction.

In an advantageous embodiment of the invention, the strain measurement sensors of the strain gauges in the sensor system are electrically connected to form a full Wheatstone bridge. This particular circuit arrangement has the advantage that it results in compensation of temperature and vibration. In particular, the connection socket features four active strain measurement sensors.

It is advantageous that at least one strain measurement sensor in the sensor system is electrically connected to determine the resistance. This circuit is preferably arranged in parallel to the circuit for pressure or expansion measurement. A plurality of strain measurement sensors can also expediently each be connected individually in a circuit for determining resistance, in order to improve the measurement quality. The parallel determination of resistance processes by a single strain measurement sensor make it possible to draw conclusions regarding vibrations. This results in the advantage that the sensor system enables vibration detection in parallel with pressure measurement.

A receiving groove is expediently designed in the outer wall of the measurement section, extending circumferentially around the outer wall of the measurement section, in particular extending all the way around the circumference, for the integration of an electronic circuit of the sensor system and/or the strain measurement sensors. The receiving groove improves the protection and reduces the space required to accommodate the sensor system.

Preferably, the strain measurement sensors are each arranged in a measurement groove designed in the outer wall of the measurement section and extending parallel to the fluid channel axis. In a further embodiment, the measurement groove extends over the entire axial expanse of the measurement section along the fluid channel axis. It is also advantageous that, due to the introduction of the two measurement grooves, a greater proportion of the expansion in the measuring section can be recorded.

Considering the usage locations, external influences, and the resulting lifespan of the connection socket, in a preferred embodiment the connection socket features a coating, in particular an anti-corrosion coating, at least on one outer surface facing away from the fluid channel. The advantage in combination with the strain gauges is that the strain gauges are expediently arranged on the coating, in particular the anti-corrosion coating. The anti-corrosion coating is advantageously designed as a zinc-nickel coating. In particular, the arrangement of the strain gauges on the coating has the advantage that the connection socket can be produced and coated more easily and the sensor system is not damaged in the coating process.

It is particularly advantageous that the connection interface of the sensor system is designed as an electrically inductive connection interface. In particular, an electrical supply voltage can be transferred to the sensor system, or rather, to the strain gauges, via the connection interface. The inductive supply voltage can be transferred by means of a clamp, wherein the clamp engages around the connection socket, in particular in a form-fitting and friction-fitting manner.

Preferably, the connection interface of the sensor system is designed as a cableless or wireless connection interface, by which data can be transferred to and/or from the sensor system. For example, the wireless or cableless connection interface is designed as an electrically inductive or radio or Bluetooth or WiFi connection interface.

The electrically inductive connection interface is expediently arranged in the receiving groove. In an advantageous embodiment, the data can be transferred to and/or from the sensor system via the connection interface. It is especially advantageous that the voltage input as well as the measurement signal output occur via the same connection interface.

For the purpose of connecting the sensor system to the control unit by means of an inductive transfer, the clamp is preferably connected to the control unit by a cable. The clamp surrounds the receiving groove and the sensor system or the connection interface of the sensor system arranged therein. The clamp can be designed such that it can be mounted manually by an assembler on the connection interface, in particular on the receiving groove. Preferably, the clamp is expanded—manually or with a tool—in the elastic area and subsequently clipped, snapped, or clamped onto the connection socket by means of elastic recovery. Alternatively, the clamp can be plastically deformed, in particular under the influence of temperature, and is pressed or formed manually and/or with a tool onto the connection socket.

According to an alternate embodiment, a voltage source is arranged on the connection socket itself. Voltage can be applied to the sensor system via the voltage supply. The voltage source is expediently a battery, which is in particular arranged in the receiving groove. The voltage source makes it possible to avoid the use of an external power supply. This design is particularly advantageous in remote or hard-to-reach usage locations.

A preferred embodiment in which the connection interface of the sensor system is designed as a transmitter element and/or receiver unit for generating a radio or Bluetooth or WiFi signal or for receiving such signals, is particularly advantageous for difficult usage locations. In particular, the control unit features its own transmitter element or receiver element that is correspondingly designed and configured to correspond to the transmitter element or receiver element. In particular, a cable connection between the sensor system and the control unit can be omitted, which expands the diversity of usage locations of the connection socket and the access points of the control unit. Additionally, the risk of accidents and the effort required for assembly due to the placement of separate lines is reduced.

In particular in this regard, in an advantageous application the control unit is designed as a mobile device, which either directly or indirectly receives the measurement signals emanating from the connection interface of the connection socket using receiver elements. Mobile devices are in particular mobile telephones, tablets, wearable computers, and the like. A direct connection is in particular a connection, for example over Bluetooth, with which the control unit and sensor system communicate directly with one another. An indirect connection is in particular a connection in which a device, for example a network device, is connected in between, in order to, for example, make the measurement signal available to a network via a WiFi-based connection. In particular, an indirect connection enables protected access to the measurement signals restricted to a network as well as remote access to the measurement signals via the internet.

Furthermore, the object of the invention is attained by a control unit according to claim 22 for connecting to the previously mentioned sensor system for measuring of a fluid pressure of the connection socket.

According to the invention, the control unit features connecting means for a data connection to the sensor system of the connection socket and calculation means for calculating the fluid pressure in the connection socket using the received data and using the line-specific or medium-specific parameters saved in the control unit.

Particularly advantageously, along with the simple pressure measurement and optionally the vibration measurement, the invention also preferably enables a temperature determination of a medium located in the fluid channel. It is advantageous that the calculation means of the control unit is designed to calculate a temperature of a medium located within the fluid channel by means of the measurement data and the parameters. A baseline reference point is expediently determined at a known temperature, at least of the medium, and a known expansion in the measurement section, from which conclusions can be drawn about the temperature of the medium via the relative expansion and taking into account line-specific and/or medium-specific parameters.

Additional advantageous designs of the invention are indicated in the following description of figures and the dependent subordinate claims.

DETAILED DESCRIPTION

Figure 1:
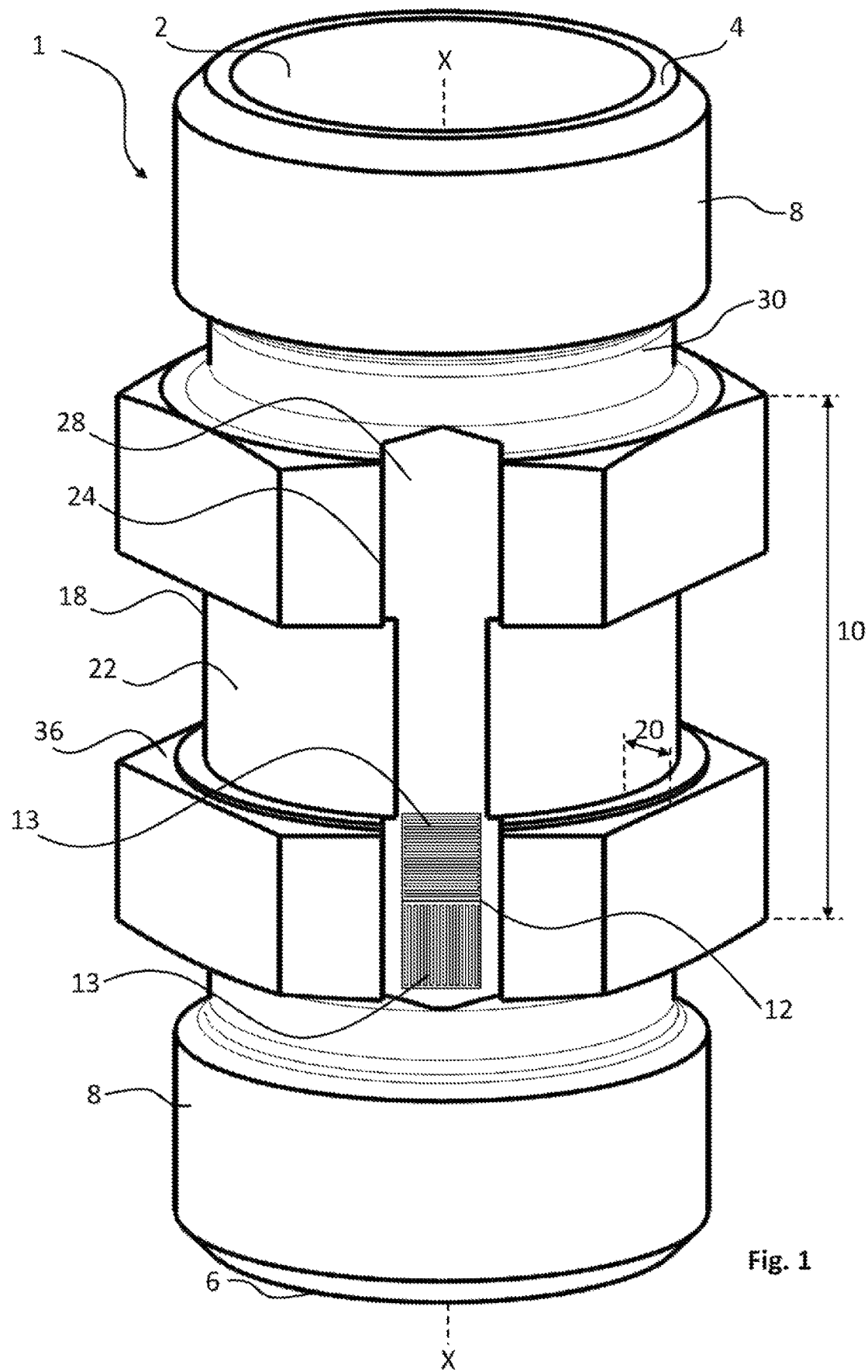
FIG. 1 is a perspective view of a first embodiment of a connection socket.

Identical parts are always marked with the same reference numerals in the various figures of the illustration.

For the following description note that the invention is not restricted to the exemplary embodiments and therefore not to all or multiple features of the described feature combinations; furthermore, every individual partial feature of each and every design example is also meaningful for the object of the invention separately from all other partial features described in combination, and also in combination with any features of another exemplary embodiment.

In each of the FIGS. 1, 5, 6, 9, and 10, a connection socket 1 for fluid-conducting line systems is depicted. This connection socket 1 features a fluid channel 2 which extends along a fluid axis X, wherein the fluid channel 2 can be connected to guide channels of the line system on at least a first connection end 4 and a second connection end 6 of the connection socket 1. The guide channels of the line system are not depicted in the figures.

The connection ends 4, 6 of the connection socket 1 can be designed such that the connection socket 1 can be connected to a pipe or to a subassembly. In particular, at least one connection end 4, 6 features an external thread 8 facing out from the fluid channel 2 for mounting a pipe or for screwing into a subassembly. Alternatively, at least one connection end 4, 6 features an internal thread facing in toward the fluid channel 2 for screwing in an adapter element of a subassembly or for screwing in a pipe. It is advantageous that at least one connection end 4, 6 is designed as an arbor and/or as a sleeve and/or as a plug. It is expedient that at least one connection end 4, 6 is materially bonded to a subassembly or a pipe, in particular welded, soldered, or glued. According to a particularly preferred embodiment, an external thread 8 is designed on both connection ends 4, 6 for screwing into a pipe or into a subassembly, as is schematically depicted in FIGS. 1 and 5 through 10.

A measurement section 10 is designed between the first connection end 4 and the second connection end 6, corresponding to the depiction in FIG. 1. A sensor system for pressure measurement of a medium flowing through the fluid channel is arranged in this measurement section 10. The sensor system features a connection interface, by which it can be connected to a control unit for measuring the pressure within the fluid channel 2. In FIG. 1 the connection interface and the control unit are not depicted for the sake of simplicity.

According to the invention, the sensor system features at least two strain measurement sensors for pressure measurement. The strain measurement sensors, as depicted in FIG. 2, are arranged on the circumference around the fluid channel axis X in an offset manner on an outer wall 14 of the measurement section 10.

Figure 2:
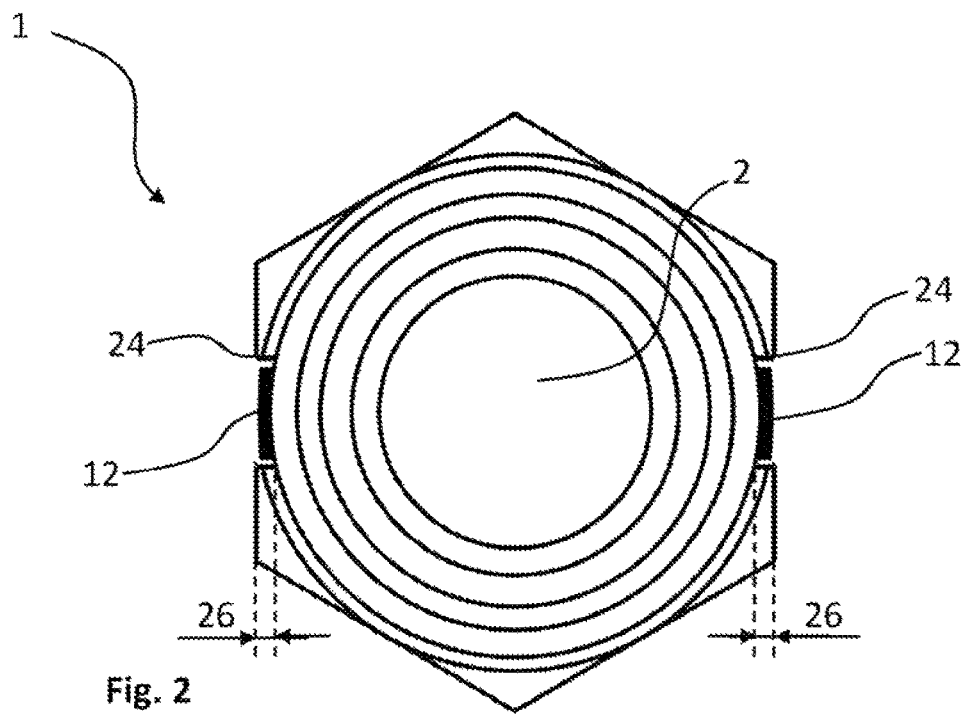
FIG. 2 is a top view of the connection socket according to FIG. 1 in an axial direction of a fluid axis according to FIG. 1

The connection socket 1 depicted in FIG. 2 corresponds to a preferred embodiment, according to which the strain measurement sensors are arranged in an offset manner from one another by 180° around the circumference of the fluid channel axis X. According to an additional embodiment—not depicted—the strain measurement sensors are arranged in an offset manner from one another by 90° around the circumference of the fluid channel axis X.

Figure 4:
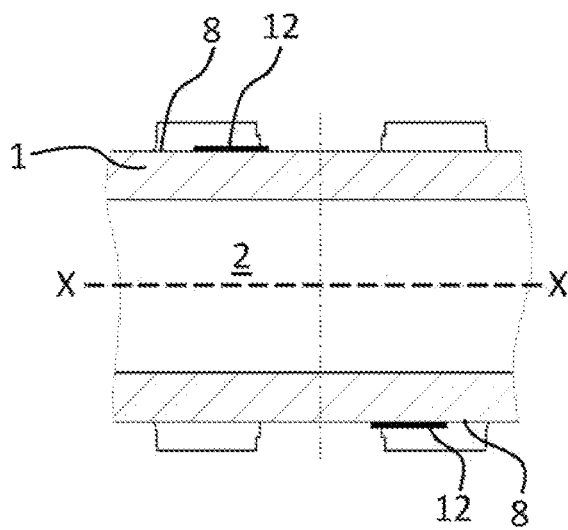
FIG. 4 is a longitudinal section along the fluid axis X according to FIG. 1

Most preferably, according to the embodiment depicted in FIG. 4, the strain measurement sensors are arranged in an offset manner to one another along the fluid channel axis X.

The strain measurement sensors pick up expansions in the measurement section 10, in particular expansions that are not visible to the human eye, and output these as measurement signals, in particular in the form of changes in resistance or changes in voltage.

By measuring the expansion or change in length that occurs in the connection socket 1 and the interpretation of the measurement signals, in particular by means of the control unit, it is possible to determine the pressure in the line system. The change in length of the connection socket 1 thereby directly correlates with the pressure received in the line system. Corresponding to the arrangement of the strain gauges 12 in FIG. 1, the strain measurement sensors used as sensors for pressure measurement are not in contact with the medium being conducted in the line system. In particular, due to this the connection socket 1 according to the invention is suitable for nearly any medium in the line system, with the only prerequisite being that the connection socket 1 itself, that is, the material of which it is made, is compatible with this medium. This means that the sensor system can also be used for aggressive media, such as hydrogen, for which only a few—expensive—acceptable pressure sensors exist.

As depicted in FIGS. 1, 5, 6, 9, and 10, the sensor system with a connection socket 1 according to the invention, can be easily retrofitted into existing line systems in a space-saving manner.

In particular, due to the 180° offset of the strain measurement sensors around the fluid channel axis X on the connection socket 1, as depicted in FIGS. 2 and 4, external influences, such as expansion or tension due to assembly forces, can be compensated by the arrangement and connection of the strain measurement sensors. A differentiation can expediently be made between expansion caused from the outside and expansion caused from the inside, which allows conclusions to be drawn about the pressure in the line system.

Figure 3:
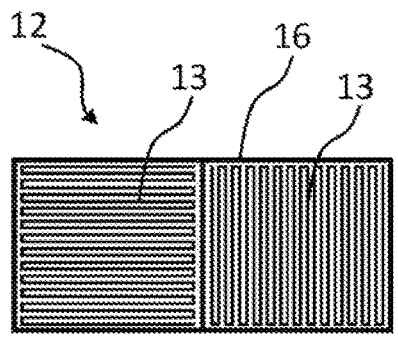
FIG. 3 is a schematic depiction of a carrier film with two strain gauges.

It is especially advantageous that the strain measurement sensors are designed as strain gauges 12, as is schematically depicted in FIGS. 1 and 3, each featuring at least one strain measurement sensor 13.

In particular, the strain gauges 12 extend in their longitudinal direction along the fluid channel axis X, as is depicted in FIG. 1.

It is advantageous that at least one strain measurement sensor 13 is arranged on a carrier film 16. Preferably, the strain gauges 12 each feature two strain measurement sensors 13 on a carrier film 16, as depicted in FIGS. 1 and 3. In particular, the first strain measurement sensor 13 measures an expansion in the longitudinal direction and the second strain measurement sensor 13 measures an expansion in the transverse direction. Most preferably the carrier film 16 is connected in a materially bonded manner to the connection socket 1. The strain measurement sensors 13 are expediently connected in a materially bonded manner to the carrier film 16, as depicted in FIGS. 1 and 3.

The connection socket 1 depicted in FIG. 1 corresponds to a preferred embodiment with two strain gauges 12 and four strain measurement sensors 13, wherein respectively two strain measurement sensors 13 are arranged adjacent to one another on the same carrier film 16, as depicted in FIG. 3.

In an advantageous embodiment of the invention, the strain measurement sensors 13 in the sensor system are electrically connected to form a full Wheatstone bridge. Since the circuit connection to form a Wheatstone bridge is inherently known, a graphical depiction of this is omitted from the figures for a better overview. In particular, the connection socket 1 features four active strain measurement sensors 13, preferably two strain measurement sensors 13 to each respective carrier film 16, wherein one strain measurement sensor 13 of each respective carrier film 16 measures a longitudinal expansion along the fluid channel axis X and one strain gauge 12 measures a transverse or circumferential expansion of the connection socket 1. For example, the embodiment of the connection socket 1 depicted in FIG. 1 features at least one such strain gauge 12. The embodiment of a strain gauge 12 with a carrier film 16 and two strain measurement sensors 13 is schematically depicted in FIG. 3. It is expedient that the two strain measurement sensors 13 are rotated by 90° to one another on the carrier film 16, as depicted in FIG. 3, and are arranged along the fluid channel axis X behind one another in the longitudinal direction.

The circuit connection to form a full Wheatstone bridge advantageously enables bending, vibration, and temperature influences to be compensated in the measurement and makes it possible that a normal strain, that is axial to the fluid channel axis X, can be measured independently of a flexural strain. An additional advantage is that the circuit connection to form a full Wheatstone bridge generates a high output signal or measurement signal and an excellent common mode rejection (CMR).

It is advantageous that at least one individual strain measurement sensor 13 in the sensor system is electrically connected to determine resistance. Corresponding to the formation of a full Wheatstone bridge, a visual depiction of the circuitry arrangement for determining resistance of the individual strain gauge 12 is omitted. This circuit is preferably arranged in parallel to the circuit for pressure or expansion measurement, in particular parallel to the full Wheatstone bridge. A plurality of strain measurement sensors 13 can also expediently each be connected individually in the sensor system for determining resistance, in order to improve the measurement quality by means of data comparison, for example by creating an average. The parallel resistance determination processes of a single strain measurement sensor 13 make it possible to measure vibrations in the connection socket 1.

In particular, the strain gauges 12 are highly sensitive strain gauges 12 which can advantageously output the expansion to the control unit with a precision of $10^{-4}$ mm.

According to one embodiment, the strain gauges 12 are designed as film strain gauges. Preferably, a piezoresistive strain gauge, typically a resistance wire, is affixed to a carrier film 16. The film advantageously serves as a means to enable attachment, in particular gluing, on the connection socket 1.

According to another embodiment, the strain gauges 12 are designed as silicon strain gauges. The silicon strain gauge advantageously offers a very high sensitivity with a simultaneously small size. The silicon strain gauge is preferably mounted on the connection socket 1 by gluing or by a glass soldering process. An alternative, potentially more affordable, mounting process is expediently made possible through the option of glass soldering.

The strain gauge 12, in particular the silicon strain gauge 12, is expediently mounted on the connection socket 1 by a combination of gluing and glass soldering. Preferably, the silicon strain gauge 12 is first soldered onto the carrier film 16. This carrier film 16 is subsequently glued onto the connection socket 1. This combination of materially bonded attachment has the advantage that due to the enlargement of the surface area which arises from the carrier film 16, creep effects can be reduced in comparison to directly gluing a silicon strain gauge. Simultaneously, a simple assembly by means of gluing onto the connection socket 1 can be performed. The complex process of direct glass soldering can hereby be simplified. In the process of direct glass soldering onto a component, the entire component is heated and cooled continuously with the fluid glass solder, so that no stress fractures occur. The soldering of a carrier film 16, in contrast, can be performed reliably and independently of the component, in particular independently of the connection socket 1. According to another embodiment, the strain gauges 12 are designed as thin-film strain gauges. Similar to the film strain gauge, a thin-film strain gauge is advantageously a technology in which a piezoresistive strain gauge is affixed to a carrier film 16. The thin-film strain gauge is advantageously produced in a thin-film printing process.

According to another embodiment, the strain gauges 12 are designed as thick-film strain gauges. A piezoresistive paste which is applied directly to the connection socket 1 in a printing process is advantageous.

Alternatively to the strain gauge 12, the strain measurement sensors are designed as piezoceramic sensors. The piezoceramic sensors advantageously generate an electrical voltage as soon as a mechanical force is exerted upon the connection socket 1. The voltage generated can be evaluated as a measurement signal.

According to another alternative to the strain gauges 12 and the piezoceramic sensor, a capacitive measurement process can be used. In particular, an expansion of the connection socket 1 displaces a plate of a capacitor in relation to a fixed plate. A change in the capacitance expediently results due to the change in distance. The change in capacitance can, in turn, be evaluated as a measurement signal.

In another alternative to the previously mentioned strain measurement sensors, an inductive measurement process is used. For the purpose of recognizing the expansion of the connection socket, the change of distance is converted into a measurement inductance. The measurement inductance is preferably excited via alternating current. The changing measurement inductance due to the change in distance is expediently recorded by downstream electronics.

In particular, the strain measurement sensors are each located in a corresponding measurement groove 24. This measurement groove 24 is designed in the outer wall 14 of the measurement section 10 and extends parallel to the fluid channel axis X. In FIGS. 1, 2, and 4 through 8, the measurement grooves 24 are designed such that the measurement grooves 24 of the connection socket 1 extend over the entire axial progression of the measurement section 10. According to an example which is not depicted, more than one strain measurement sensor can also expediently be arranged in one shared measurement groove 24. It is particularly advantageous that the measurement grooves 24 are designed symmetrically to the fluid channel axis X and/or feature a measurement groove base 28 which is planar and extends parallel to the fluid channel axis X. It is also advantageous that, due to the introduction of the two measurement grooves 24, a greater extent of the expansion in the measuring section 10 can be recorded due to the removal of material from the connection socket 1.

As is depicted in FIG. 2, the measurement groove 24 features a measurement groove depth 26 to the measurement groove base 28 which is extended radially with respect to the fluid channel axis X, wherein a wall of the connection socket 1 remains between the measurement groove base 28 and the fluid channel 2 with a residual wall thickness. The measurement groove depth 26 of the measurement groove base 28 of the measurement grooves 24 expediently corresponds at most to the minimum outer diameter of the connection socket 1 outside of the measurement section 10.

The measurement groove depth 26 and the residual wall thickness of the wall are designed such that at least the maximum occurring internal pressure in a functional line system does not lead to plastic deformation of the connection socket 1. In particular the measurement groove depth 26 and the residual wall thickness of the connection socket 1 are designed as adapted to the internal pressure in the fluid channel 2 such that the connection socket 1 can be loaded with preferably a maximum internal pressure in the fluid channel 2 of in particular 3200 bar, expediently more than 3200 bar, without it being plastically deformed. The measurement groove depth 26 and the residual wall thickness are advantageously designed as adapted to the internal pressure in the fluid channel 2 such that the connection socket 1 can be loaded with a safety pressure without being plastically deformed. The safety pressure is created in particular in that the maximum internal pressure in the fluid channel 2 is multiplied by a safety factor. The safety factor is in particular 1.5 to 6.5, preferably 2 to 6, preferably 3 to 5, and particularly preferably 4.

As is depicted in FIGS. 1, 6, 7, 9, and 10, in an advantageous embodiment a receiving groove 18 extending circumferentially around the outer wall 14 of the measurement section 10 is designed in the outer wall 14 of the measurement section 10. This circumferential receiving groove 18 expediently serves for integration of an electrical circuit of the sensor system and/or in particular the connection interface of the sensor system for the strain measurement sensors and/or particularly preferably for integration of the strain measurement sensors. As an example, the strain measurement sensors are integrated into the circumferential receiving groove 18 in FIGS. 9 and 10. Due to the receiving groove 18 in the connection socket 1, a disorderly arrangement of the sensor system on the connection socket 1 is avoided. The sensor system is not depicted in FIGS. 1, 6, 7, 9, and 10. In particular, the circuit can comprise electrical lines and/or circuit boards and/or power supplies and/or other electrical circuitry components. The connection interface is in particular designed as a transmitter and/or a receiver and/or a plug and/or a socket and/or a connection cable. The arrangement of the strain measurement sensors in the receiving groove 18 has advantages in manufacturing on the one hand, as the circumferential receiving groove 18 is easier to fabricate, and on the other hand has the advantage that damage due to assembly tools, such as open-ended wrenches, is avoided.

Figure 9:
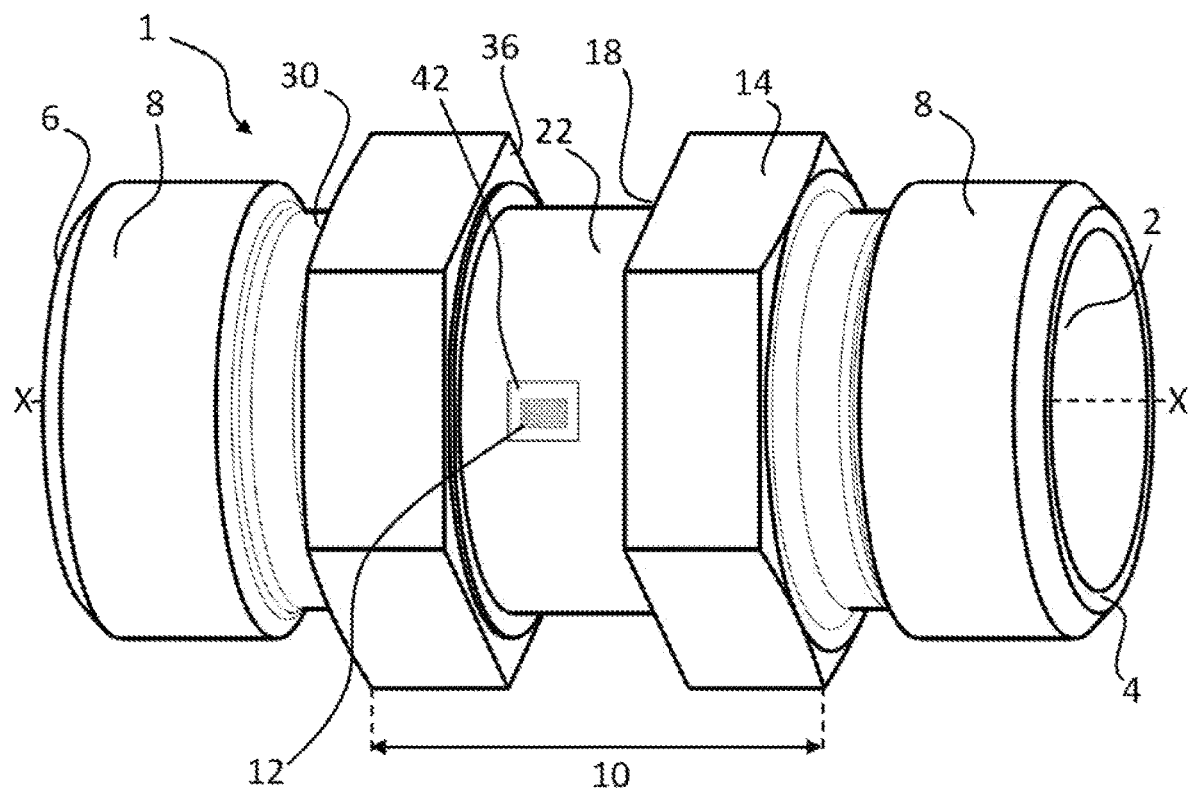
FIG. 9 is a perspective view of a fourth embodiment of a connection socket with a receiving groove.
Figure 10:
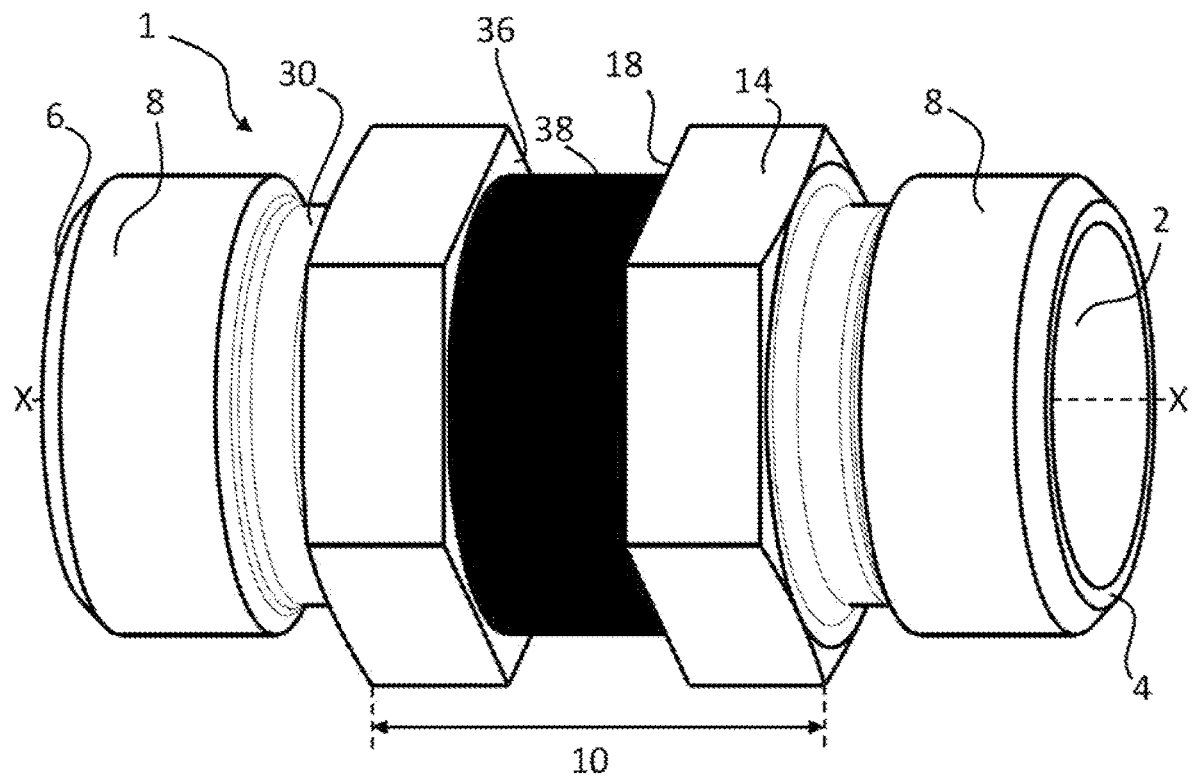
FIG. 10 is a perspective view of a fifth embodiment of a connection socket with a partially molded receiving groove.

It is particularly advantageous that the strain measurement sensors are respectively arranged in a flat area 42 in the receiving groove 18, as depicted in FIG. 9, or of the measurement groove 24 or rather in a transitional area between the measurement groove 24 and the receiving groove 18. The flat area 42 thus offers additional protection. The flat area 42 is in particular easier to fabricate in a circumferential receiving groove 18 than in the axial measurement groove 24.

As depicted in FIGS. 1 and 5 through 10, the receiving groove 18 is preferably arranged in the middle of the connection socket 1. The receiving groove 18 features a receiving groove depth 20 to the receiving groove base 22 which is pronounced radially with respect to the fluid channel axis X, wherein a wall of the connection socket 1 remains between the receiving groove base 22 and the fluid channel 2 with a residual wall thickness. The receiving groove depth 20 and the residual wall thickness of the wall are designed such that at least the maximum occurring internal pressure in a functional line system does not lead to plastic deformation of the connection socket 1. In particular, the receiving groove depth 20 and the residual wall thickness of the connection socket 1 are designed in accordance with the same requirements with regard to pressure rating as the measurement groove 24 with regard to the measurement groove depth 26 and the residual wall thickness of the connection socket 1.

The receiving groove 18 as well as the measurement groove 24 each respectively have in particular a protective effect for the sensor system, in particular for the strain measurement sensors and/or the electrical circuit and/or the connection interface.

The connection socket 1 is designed with an outer surface 30 facing away from the fluid channel 2. This outer surface 30 preferably features a coating, in particular an anti-corrosion coating. This coating has the advantage in particular that the connection socket 1 is more resistant to external influences and the lifespan of the connection socket 1 is increased.

It is particularly preferable that the strain gauges 12 are expediently arranged on the coating, in particular on the anti-corrosion coating. The anti-corrosion coating is particularly preferably designed as a zinc-nickel coating. The zinc-nickel coating is expediently used with a transparent or black passivation layer. In particular, the passivation is an inorganic conversion layer generated on the zinc-nickel layer which is generated by dipping in a solution of chemicals designed for this purpose. The solution is advantageously a trivalent chromium compound. In particular, the arrangement of the strain gauges 12 on the coating has the advantage that the connection socket 1 can be produced and coated more easily and the strain gauges 12 are not damaged in the coating process from the connection socket 1.

According to an advantageous embodiment which is not depicted, a voltage source is arranged on the connection socket 1 itself. Voltage can be applied to the sensor system via a voltage supply. The voltage source is expediently a battery, and is in particular arranged in the receiving groove 18. The power supply makes it possible to omit an external power supply and increases the independence of the connection socket 1, in particular in combination with a cable-less or wireless data connection. This design is particularly advantageous in remote or hard-to-reach usage locations.

Figure 7:
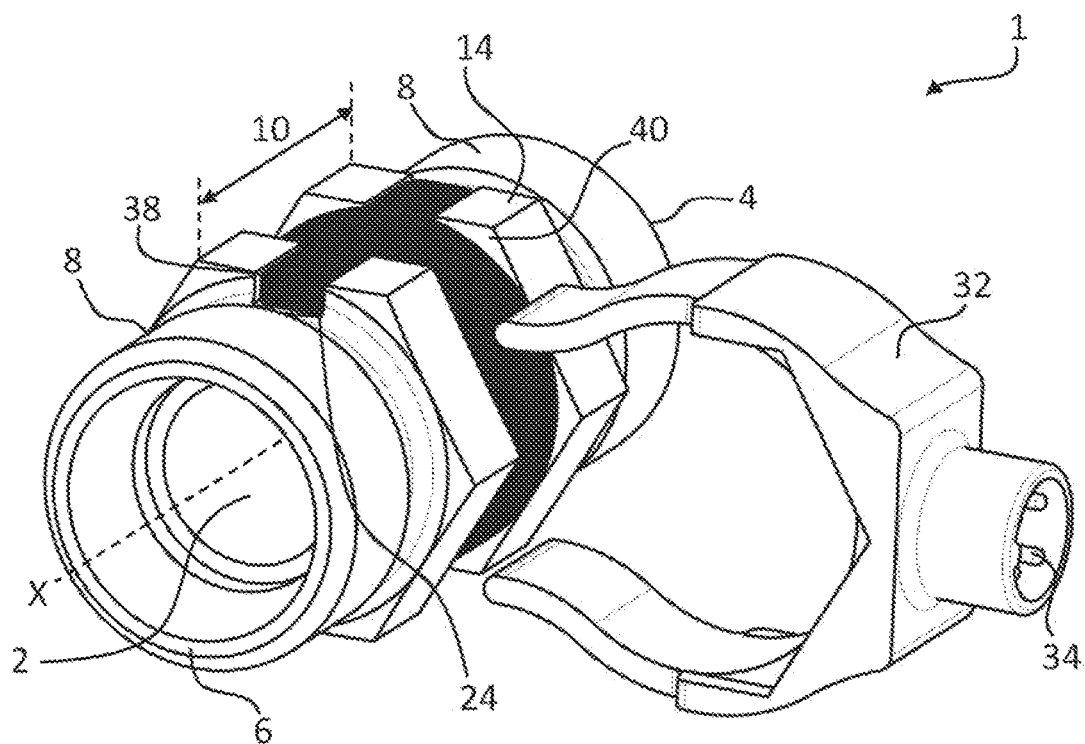
FIGS. 7 and 8 are a perspective depiction of a connection process of the third embodiment of a connection socket according to FIG. 6 to a control unit.
Figure 8:
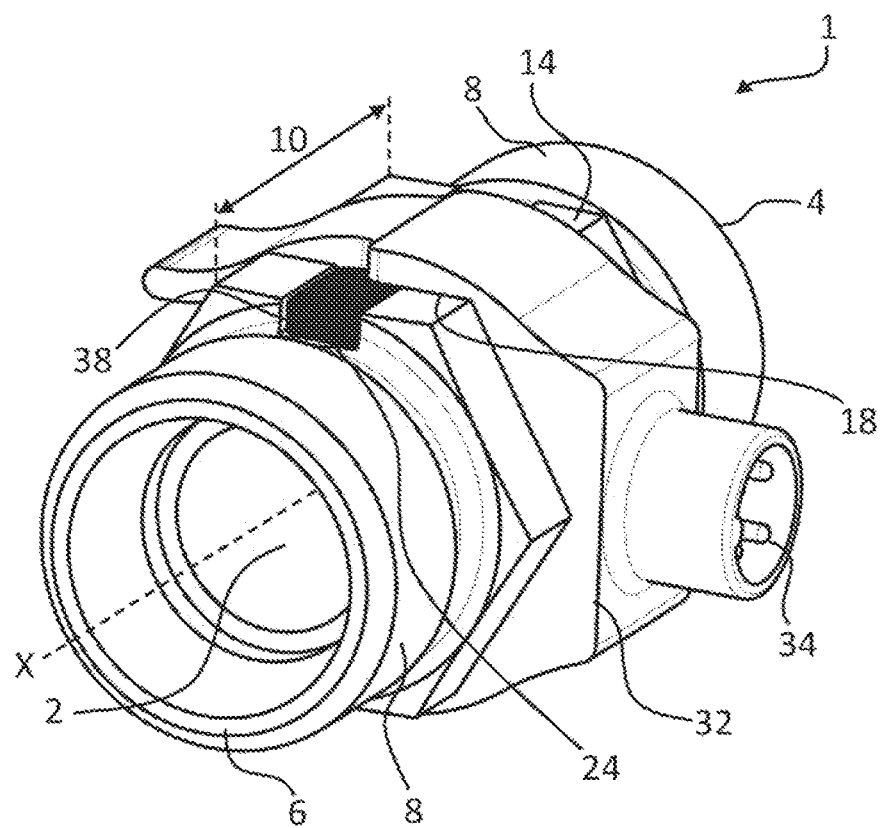

It is particularly advantageous that the connection interface of the sensor system is designed as an electrically inductive connection interface. In particular, an electrical supply voltage can be transferred to the sensor system via the connection interface, as is depicted in FIG. 8. The supply voltage can be transferred in an electrically inductive manner by means of a clamp 32 which is depicted in FIGS. 7 and 8. Corresponding to FIG. 8, the clamp 32 is arranged in particular in a form-fitting and friction-fitting manner in the measurement section 10, in particular in the receiving groove 18.

The connection interface of the sensor system is expediently designed as a cableless or wireless connection interface, by which data can be transferred to and/or from the sensor system. For example, the wireless or cableless connection interface can be designed as an electrically inductive or radio or Bluetooth or WiFi connection interface.

In particular in the embodiment depicted in FIG. 8, the sensor system is connected to the control unit by means of an electrically inductive connection interface. In particular, the control unit is connected to the clamp 32 via a cable, in FIGS. 7 and 8 only a plug 34 is depicted on the clamp 32 for connecting to the cable. Preferably, the clamp 32 connected to the cable surrounds the receiving groove 18 and the connection interface arranged therein, as depicted in FIG. 8. In particular, side walls 36 of the receiving groove 18 facing in an axial direction with respect to the fluid channel axis X prevent the clamp 32 from axial displacement.

In an advantageous embodiment, the connection interface of the sensor system is designed as an electrically inductive connection interface, by which data can be transferred to and/or from the sensor system. In particular, a supply voltage emanating from the control unit is transferred inductively to the sensor system, and preferably also the measurement signal, the expansion output as a change in resistance or a change in voltage is also inductively transferred to the control unit. It is particularly advantageous that the voltage input as well as the measurement signal output take place over the same connection interface, in particular the interface surrounded by a clamp 32 in FIG. 8.

The clamp 32 is preferably designed such that it can be mounted manually by an assembler on the connection interface, in particular on the receiving groove 18. Preferably, the clamp 32 is expanded—manually or with a tool—in the elastic area and subsequently clipped, snapped, or clamped onto the connection socket 1 by means of elastic recovery. Alternatively, the clamp 32 can be plastically deformed, in particular under the influence of temperature, and is pressed or formed manually and/or with a tool onto the connection socket 1. The clamp 32 is expediently arranged on the connection socket 1 with a form-fitting and friction-fitting placement.

In order to improve the application possibilities of the connection socket 1, the connection interface of the sensor system is designed in a—not depicted—advantageous embodiment as a transmitter element and/or a receiver element for generating and/or for receiving a radio or Bluetooth or WiFi signal. Thus the control unit features its own transmitter element and/or receiver element that is correspondingly designed and configured to correspond to the transmitter element and/or receiver element. In particular, a cable connection from control unit to the sensor system can be omitted, which expands the diversity of usage locations of the connection socket 1 and the access points of the control unit. Additionally, the risk of accidents and the effort required for assembly due to the placement of separate electrical lines is reduced. In this context it is particularly advantageous that the connection socket 1 features a transmitter element and/or receiver element as well as a power supply arranged on the connection socket 1.

It is particularly advantageous that the control unit is a mobile device, which either directly or indirectly receives the measurement signals emanating from the connection interface of the connection socket 1 using receiver elements. Mobile devices are in particular mobile telephones, tablets, wearable computers, and the like. A direct connection is in particular a connection, for example over Bluetooth, by which the control unit and sensor system communicate directly with one another. An indirect connection is in particular a connection in which a device, for example a network device, is connected in between, in order to, for example, make the measurement signal available to a network via a WiFi-based connection. In particular, an indirect connection enables protected access to the measurement signals restricted to a network as well as remote access to the measurement signals via the internet.

Corresponding to the advantageous embodiments in FIGS. 5 through 8 and 10, the measurement section 10 is at least partially molded together with the strain measurement sensors, in particular together with the sensor system, in particular the connection interface and/or the power supply, using a plastic 38. In particular when the connection interface is connected to the control unit via a cable, it is preferable that at least one connection point is designed for connecting the cable.

Figure 5:
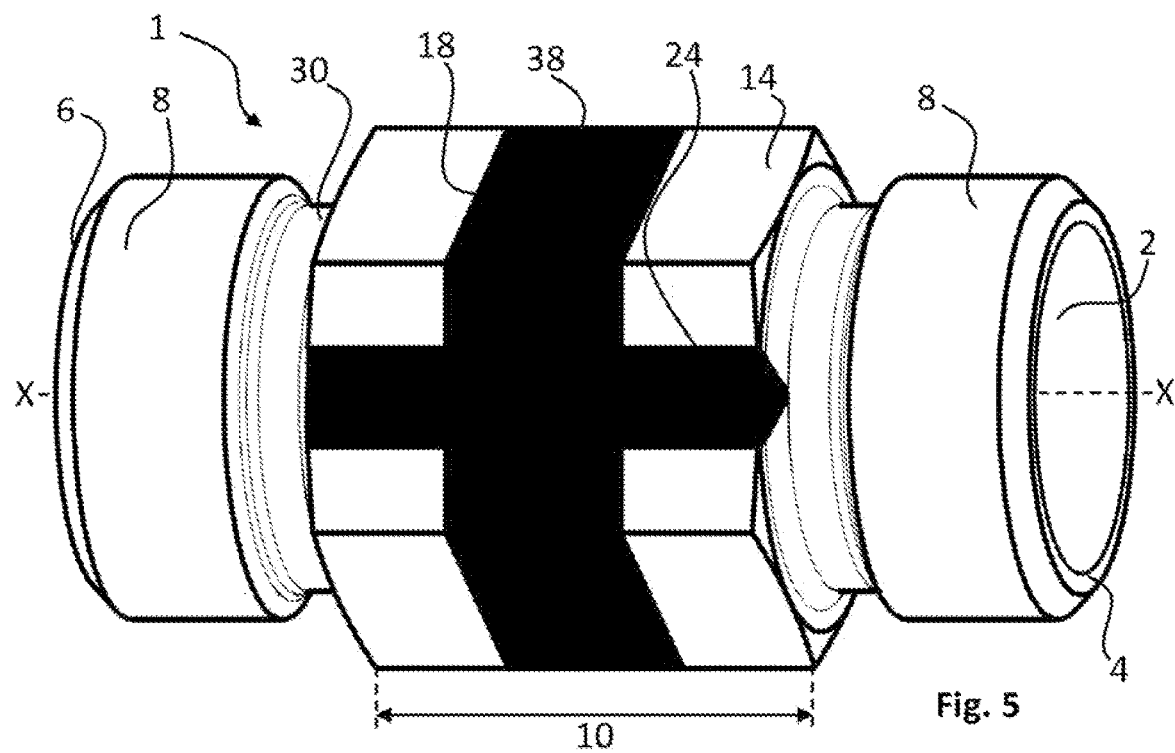
FIG. 5 is a perspective view of a second embodiment of a connection socket with a molded measurement and receiving groove.
Figure 6:
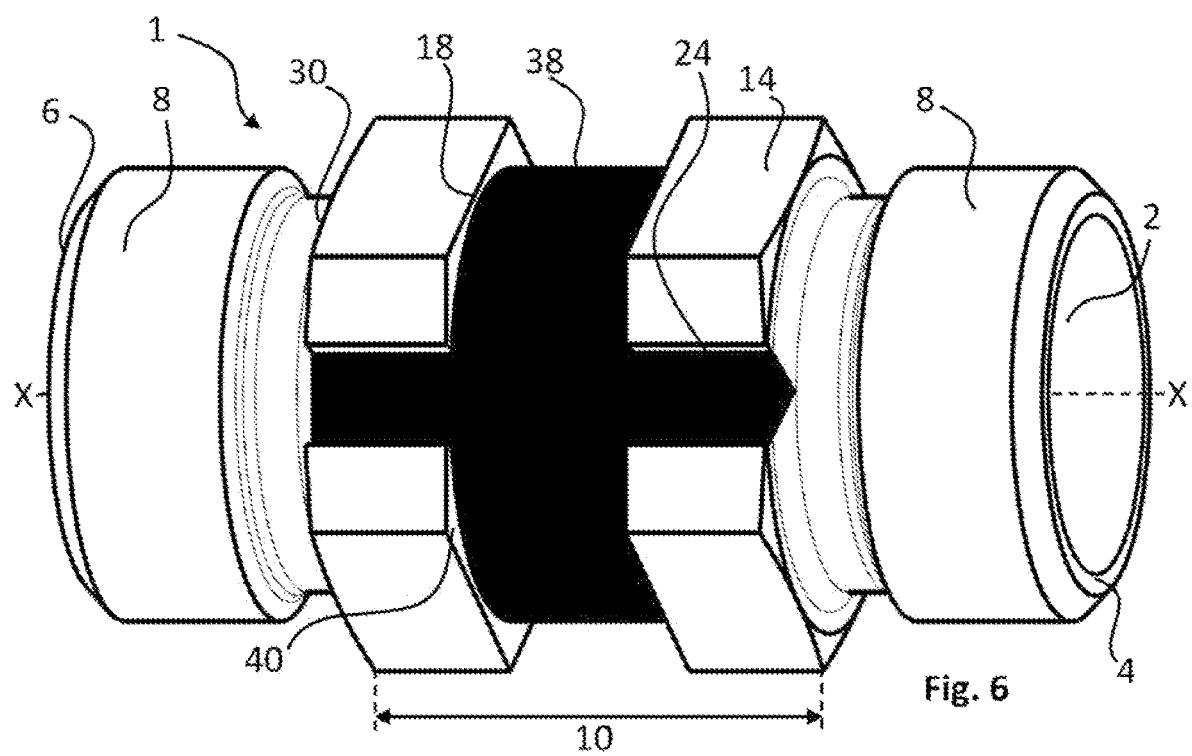
FIG. 6 is a perspective view of a third embodiment of a connection socket with a partially molded measurement and receiving groove.

In particular in FIG. 5 the entire measurement groove 24 and receiving groove 18 is molded with the plastic 38, in particular the plastic is molded over the entire measurement groove depth 26 and/or the receiving groove depth 20, so that a smooth or homogeneous outer wall 14 of the measurement section 10 of the connection socket 1 results. In the exemplary embodiment according to FIG. 9, which features only one receiving groove 18, according to an embodiment which is not depicted the receiving groove 18 can be molded with the plastic 38 over the entire receiving groove depth 20.

In the exemplary embodiment depicted in FIGS. 6 through 8 and 10, the measurement grooves 24 and/or the receiving grooves 18 are expediently partially molded over the measurement groove depth 26 and the receiving groove depth 20. In the exemplary embodiment according to FIG. 10, which features only one receiving groove 18, the receiving groove 18 is advantageously partially molded over the receiving groove depth 20 with the plastic 38. In particular, a residual side wall 40 of the receiving groove 18 remains, so that the clamp 32 or another connecting element can be arranged for contacting the molded connecting point in the remaining receiving groove 18.

In one particular embodiment, the sensor system features at least one temperature sensor for determination of the ambient temperature and/or the temperature of the connection socket 1. The temperature sensor makes it possible to improve the measurement quality of the pressure measurement by calculating the heat-dependent expansion effects of the medium flowing through the fluid line.

In particular, the connection socket 1 is designed from a steel material which is coated with a zinc-nickel coating. Alternatively, however, the connection socket 1 can also be designed from other material variants, to the extent that the internal pressure in the fluid channel 2 deforms the connection socket 1 within the elastic range, and the deformation behavior is known such that the control unit can interpret the internal pressure. In particular, the deformation behavior can be determined with experimentation. The connection socket 1 is expediently advantageously designed at least partially from stainless steel or brass or plastic 38.

According to the invention, the control unit to be connected to the sensor system for pressure measurement of a fluid pressure of the connection socket 1 of the previously described type features connecting means for a data connection to the sensor system of the connection socket 1 and calculation means for calculating the fluid pressure in the connection socket 1 using the received data and using the line-specific or medium-specific parameters saved in the control unit.

According to an advantageous embodiment of the control unit, the calculation means are designed to calculate a temperature of a medium located within the fluid channel by means of the measurement data and the parameters. In particular, the control unit can interpret a temperature of a medium located in the fluid channel 2 by measuring the pressure in the fluid channel 2. A baseline reference point can expediently be determined for a known temperature, at least of the medium, and a known expansion in the measurement section 10. From this reference point, conclusions can be drawn about the temperature of the medium via the relative expansion with use of the line-specific or medium-specific parameters.

Corresponding to the example depicted in FIGS. 7 and 8, the control unit preferably features a cable-connected clamp 32 which is designed as an inductive connection interface. This clamp is particularly designed to enclose the receiving groove 18 and the connection interface of the connection socket 1 located therein. Preferably, the clamp 32 features one or more of the features previously specified for the clamp, and is mounted on the connection socket 1 as explained in FIGS. 7 and 8.

The invention is not limited to the depicted and described exemplary embodiments, but rather encompasses all designs of equivalent function in the sense of the invention. It is explicitly noted that the exemplary embodiments are not limited to all individual features in combination, but rather each individual feature can be meaningful to the invention independently of all other individual features. Furthermore, the invention has hitherto not been restricted to the combination of features as described in claim 1, but rather can also be defined by any other desired combination of features of all of the features described in total. This means that in essence practically every individual feature of claim 1 can be omitted or replaced by at least one other feature described elsewhere in this application.

The invention claimed is:

1. A connection socket for fluid-conducting line systems, the connection socket comprising: a fluid channel extending along a fluid channel axis, wherein the fluid channel is configured to be connected to guide channels of the line system on at least a first connection end and a second connection end of the connection socket, wherein a measurement section is formed between the first connection end and the second connection end, in which a sensor system is arranged for pressure measurement of a medium flowing through the fluid channel, wherein the sensor system features a connection interface configured to be connected to a control unit for pressure measurement in the fluid channel, wherein the sensor system for pressure measurement including at least two strain measurement sensors which are arranged on the circumference around the fluid channel axis offset to one another on an outer wall of the measurement section, wherein the strain measurement sensors are formed as strain gauges each with at least one strain measurement sensor element and wherein the strain measurement sensors are each arranged in a measurement groove formed in the outer wall of the measurement section and running parallel to the fluid channel axis.

2. The connection socket according to claim 1, wherein the strain measurement sensors are arranged around the circumference, offset from one another by 90° or 180° around the fluid channel axis.

3. The connection socket according to claim 1, wherein the strain measurement sensors are arranged offset to one another along the fluid channel axis.

4. The connection socket according to claim 1, wherein the strain gauges extend in their longitudinal direction along the fluid channel axis.

5. The connection socket according to claim 1, wherein the strain gauges each include two strain measurement sensor elements on a carrier film, wherein the first strain measurement sensor element measures an expansion in the longitudinal direction and the second strain measurement sensor element measures an expansion in the transverse direction.

6. The connection socket according to claim 1, wherein the strain measurement sensor elements of the strain gages in the sensor system are electrically connected to form a full Wheatstone bridge.

7. The connection socket according to claim 1, wherein at least one strain measurement sensor in the sensor system is electrically connected to determine the resistance.

8. The connection socket according to claim 1, wherein the strain gauges are highly sensitive strain gauges, which can measure the expansion with a precision of 10-4 mm.

9. The connection socket according to claim 1, wherein the strain gauge is a silicon strain gauge and is mounted on the connection socket by a combination of gluing and glass soldering.

10. The connection socket according to claim 1, wherein the measurement grooves are substantially symmetrical to the fluid channel axis.

11. The connection socket according to claim 1, wherein the measurement grooves include a measurement groove base which is planar and runs parallel to the fluid channel axis.

12. The connection socket according to claim 1, wherein the measurement groove has a measurement groove base having a measurement groove depth that corresponds at most to the minimum outer diameter of the connection socket outside of the measurement section.

13. The connection socket according to claim 1, wherein the connection socket including an anti-corrosion coating at least on an outer surface facing away from the fluid channel, wherein the strain measurement sensors are arranged on the anti-corrosion coating.

14. The connection socket according to claim 1, wherein a receiving groove is located in the outer wall of the measurement section, extending circumferentially around the outer wall of the measurement section for the integration of an electronic circuit of the sensor system and/or of the strain measurement sensors.

15. The connection socket according to claim 14, wherein a power supply is arranged on the connection socket, in the receiving groove, and a supply voltage can be applied to the sensor system by means of this power supply.

16. The connection socket according to claim 1, wherein the connection interface of the sensor system is an electrically inductive connection interface, via which an electrical supply voltage can be supplied for the sensor system.

17. The connection socket according to claim 1, wherein the connection interface of the sensor system is a wireless connection interface such that data can be transferred to and/or from the sensor system.

18. The connection socket according to claim 17, wherein the connection interface of the sensor system is an electrically inductive connection interface so that data can be transferred to and/or from the sensor system.

19. The connection socket according to claim 17, wherein the connection interface of the sensor system is a transmitter element and/or a receiver element for generating and/or receiving a radio or Bluetooth or WiFi signal.

20. The connection socket according to claim 1, wherein the measurement section is molded at least partially together with the strain gauges with a plastic.

21. The connection socket according to claim 1, wherein the sensor system features a temperature sensor for determination of the ambient temperature and/or the temperature of the connection socket.

22. A control unit configured to be connected to the sensor system for pressure measurement of a fluid pressure of the connection socket according to claim 1, the control unit including connecting means for a data connection with the sensor system of the connection socket and being configured to calculate the fluid pressure in the connection socket using the received data and using a parameter specific to a fluid line connected to the connection socket or specific to medium flowing through the connection socket saved in the control unit, wherein the control unit further comprises a clamp connected to the control unit by a cable for connecting the sensor system to the control unit by means of inductive transfer, wherein the clamp is configured to surround a receiving groove located in and extending circumferentially around the outer wall of the measurement section and the sensor system or a connection interface of the sensor system arranged therein.

23. The control unit according to claim 22, wherein the calculation means of the control unit are configured to calculate a temperature of a medium located within the fluid channel by means of the measurement data and the parameters.

* * * * *